United States Patent
Kalliola et al.

(10) Patent No.: US 11,455,029 B2
(45) Date of Patent: Sep. 27, 2022

(54) APPARATUS, METHOD AND COMPUTER PROGRAM FOR ADJUSTING OUTPUT SIGNALS

(71) Applicant: NOKIA TECHNOLOGIES OY, Espoo (FI)

(72) Inventors: Aapo Kalliola, Espoo (FI); Ian Justin Oliver, Söderkulla (FI); Yoan Miche, Klaukkalla (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/264,738

(22) PCT Filed: Aug. 5, 2019

(86) PCT No.: PCT/EP2019/071010
§ 371 (c)(1),
(2) Date: Jan. 29, 2021

(87) PCT Pub. No.: WO2020/025830
PCT Pub. Date: Feb. 6, 2020

(65) Prior Publication Data
US 2021/0303060 A1 Sep. 30, 2021

(30) Foreign Application Priority Data

Jul. 31, 2018 (EP) ..................................... 18186566

(51) Int. Cl.
*G06F 3/01* (2006.01)
*G06F 3/0346* (2013.01)
*G06F 3/038* (2013.01)

(52) U.S. Cl.
CPC .............. *G06F 3/011* (2013.01); *G06F 3/017* (2013.01); *G06F 3/038* (2013.01); *G06F 3/0346* (2013.01);
(Continued)

(58) Field of Classification Search
CPC ........ G06F 3/011; G06F 3/017; G06F 3/0346; G06F 3/038; G06F 2203/0382; G06F 2203/0384
See application file for complete search history.

(56) References Cited

U.S. PATENT DOCUMENTS 5,307,325 A 4/1994 Scheiber
9,354,709 B1 * 5/2016 Heller .................. G06F 1/1694
(Continued)

FOREIGN PATENT DOCUMENTS

JP S5624515 3/1981
JP 2012198607 10/2012
KR 20170108646 A 9/2017

OTHER PUBLICATIONS

Extended European Search Report for European Application No. 18186566.8 dated Jan. 3, 2019, 10 pages.
(Continued)

*Primary Examiner* — Cao H Nguyen
(74) *Attorney, Agent, or Firm* — Alston & Bird LLP (57) ABSTRACT

The application relates to an apparatus, method and computer program for adjusting output signals. The apparatus comprising means for receiving at least a first measurement signal from a first movement sensor and receiving at least a second measurement signal from a second movement sensor wherein the first movement sensor and the second movement sensor are provided on the same structure. The means are also for identifying one or more correlations between the measurement signals and using the identified one or more correlations to adjust at least one output signal provided by at least one detector.

19 Claims, 3 Drawing Sheets

(52) U.S. Cl.
CPC ................ *G06F 2203/0382* (2013.01); *G06F 2203/0384* (2013.01)

(56) References Cited

U.S. PATENT DOCUMENTS

| | | | |
|---|---|---|---|
| 2010/0271302 A1* | 10/2010 | Pering | G06F 3/011 |
| | | | 345/161 |
| 2015/0154447 A1* | 6/2015 | Wilson | G06F 3/038 |
| | | | 382/103 |
| 2015/0269438 A1 | 9/2015 | Samarasekera et al. | |
| 2015/0277557 A1 | 10/2015 | Raffa et al. | |
| 2016/0063997 A1 | 3/2016 | Nemala et al. | |
| 2016/0198322 A1* | 7/2016 | Pitis | H04W 4/18 |
| | | | 455/420 |
| 2017/0003747 A1* | 1/2017 | Carceroni | G06F 3/0482 |
| 2017/0364149 A1* | 12/2017 | Lu | G06F 3/013 |
| 2017/0371450 A1* | 12/2017 | Heller | G06F 3/0346 |
| 2018/0067197 A1 | 3/2018 | Schockaert et al. | |

OTHER PUBLICATIONS

Gibbs et al., "Reducing Motion Artifact in Wearable Bio-Sensors Using MEMS Accelerometers for Active Noise Cancellation", 2005 American Control Conference (Jun. 8-10, 2005), 6 pages.
International Search Report and Written Opinion for Patent Cooperation Treaty Application No. PCT/EP2019/071010 dated Oct. 29, 2019, 14 pages.
Office Action for European Application No. 19746497.7 dated May 13, 2022, 9 pages.

\* cited by examiner

This application is a national phase entry of International Application No. PCT/EP2019/071010, filed Aug. 5, 2019, which claims priority to European Application No. 18186566.8, filed Jul. 31, 2018, the entire contents of which are incorporated herein by reference.

TECHNOLOGICAL FIELD

Examples of the present disclosure relate to an apparatus, method and computer program for adjusting output signals. Some relate to an apparatus, method and computer program for adjusting output signals from a detector.

BACKGROUND

Movement sensors can be used to determine motion and/or a current position of a structure. There may be noise in the output of such movement sensors.

BRIEF SUMMARY

According to various, but not necessarily all, examples of the disclosure there is provided an apparatus comprising means for: receiving at least a first measurement signal from a first movement sensor; receiving at least a second measurement signal from a second movement sensor wherein the first movement sensor and the second movement sensor are provided on the same structure; identifying one or more correlations between the measurement signals; and using the identified one or more correlations to adjust at least one output signal provided by at least one detector.

The first movement sensor may be coupled to the at least one detector. The first movement sensor may be coupled to the at least one detector by both the first movement sensor and the at least one detector being provided within the same device. The second movement sensor may be provided within a different device and the different device may be configured to transmit information from the second movement sensor to the apparatus.

The one or more correlations between the measurement signals indicate movements common to both of the measurement signals.

The first movement sensor may be independent of the second movement sensor in that a measurement made by one of the movement sensors does not affect a measurement being made by the other movement sensor.

Identifying one or more correlations between the measurement signals may comprise using information about the structure which supports both the first movement sensor and the second movement sensor to identify common features in both of the measurement signals.

Identifying one or more correlations between the measurement signals may comprise using machine learning.

The machine learning may comprise comparing the first measurement signal and the second measurement signal when the structure makes a known movement and identifying features within the measurements signals. The known movement may comprise a predefined gesture that is performed by the structure. The machine learning may comprise determining a kinetic linking between the first movement sensor and the second movement sensor wherein the kinetic linking is dependent upon the structure that the movement sensors are provided on.

The identified one or more correlations to adjust at least one output signal provided by the detector comprises at least partially removing noise from at least one of the measurement signals The movement sensors may comprise one or more accelerometers.

The at least one detector may comprise at least one of, an imaging module, an audio capture module.

According to various, but not necessarily all, examples of the disclosure there is provided an apparatus comprising processing circuitry; and memory circuitry including computer program code, the memory circuitry and the computer program code configured to, with the processing circuitry, cause the apparatus to: receive at least a first measurement signal from a first movement sensor; receive at least a second measurement signal from a second movement sensor wherein the first movement sensor and the second movement sensor are provided on the same structure; identify one or more correlations between the measurement signals; and use the identified one or more correlations to adjust at least one output signal provided by at least one detector.

According to various, but not necessarily all, examples of the disclosure there is provided a method comprising: receiving at least one first measurement signal from a first movement sensor; receiving at least one second measurement signal from a second movement sensor wherein the first movement sensor and the second movement sensor are provided on the same structure; identifying one or more correlations between the measurement signals; and using the identified one or more correlations to adjust at least one output signal provided by at least one detector.

According to various, but not necessarily all, examples of the disclosure there is provided a computer program comprising computer program instructions that, when executed by processing circuitry, cause: receiving at least one first measurement signal from a first movement sensor; receiving at least one second measurement signal from a second movement sensor wherein the first movement sensor and the second movement sensor are provided on the same structure; identifying one or more correlations between the measurement signals; and using the identified one or more correlations to adjust at least one output signal provided by at least one detector.

According to various, but not necessarily all, examples of the disclosure there is provided a device comprising: a first movement sensor configured to provide a first measurement signal indicative of movement and/or position of the first movement sensor; at least one detector configured to detect an input and provide at least one corresponding output signal; and means for: receiving a second measurement signal from a second movement sensor located apart from the device, the second measurement signal indicative of movement and/or position of the second movement sensor; determining a displacement between the first movement sensor and the second movement sensor based on the first measurement signal and the second measurement signal; translating the second measurement signal based on the displacement between the first movement sensor and the second movement sensor; determining information about the position and/or a location of the at least one detector based on the first measurement signal and the translated second measurement signal; and using the information about the position and/or location of the at least one detector to adjust at least one output signal provided by the at least one detector.

BRIEF DESCRIPTION

Some example embodiments will now be described with reference to the accompanying drawings in which.

DETAILED DESCRIPTION

The Figures illustrate an apparatus 101 comprising means for: receiving 301 at least one first measurement signal and receiving 303 at least one second measurement signal. The first measurement signal is received from a first movement sensor 203 and the second measurement signal is received from a second movement sensor 205 wherein the first movement sensor 203 and the second movement sensor 205 are provided on the same structure 209. The means are also for identifying 305 one or more correlations between the measurement signals; and using 307 the identified one or more correlations to adjust at least one output signal provided by at least one detector 207. The detector 207 could be, for example an imaging module or an audio capture module. The apparatus 101 could be for reducing the noise in the output of the at least one detector 207.

Figure 1:
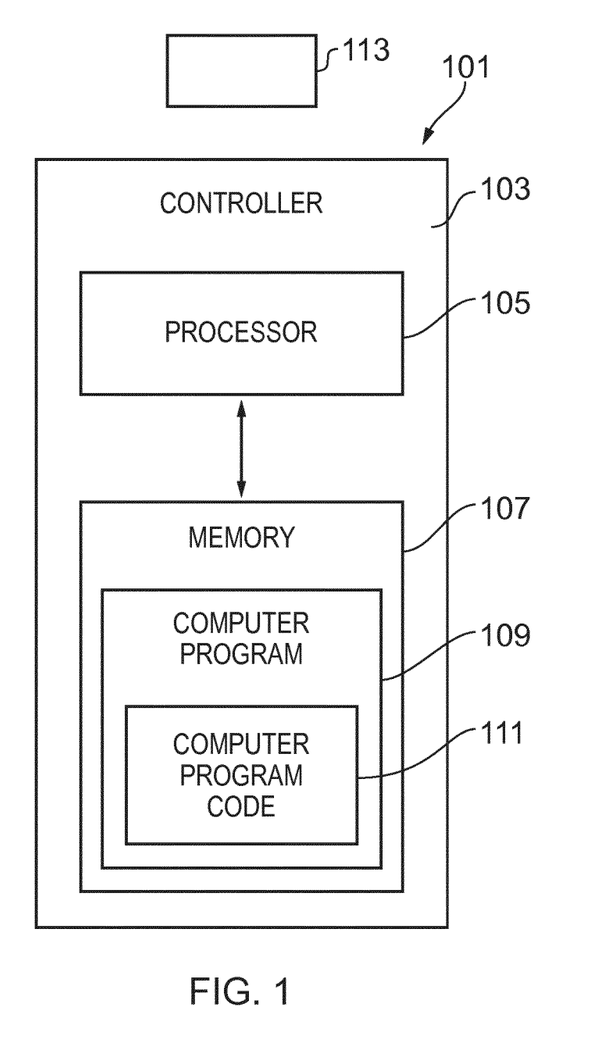
FIG. 1 illustrates an example apparatus.

FIG. 1 schematically illustrates an apparatus 101 according to examples of the disclosure. The apparatus 101 illustrated in FIG. 1 may be a chip or a chip-set. In some examples the apparatus 101 may be provided within devices such as an audio capture devices or an image capturing device.

In the example of FIG. 1 the apparatus 101 comprises a controller 103. In the example of FIG. 1 the implementation of the controller 103 may be as controller circuitry. In some examples the controller 103 may be implemented in hardware alone, have certain aspects in software including firmware alone or can be a combination of hardware and software (including firmware).

As illustrated in FIG. 1 the controller 103 may be implemented using instructions that enable hardware functionality, for example, by using executable instructions of a computer program 109 in a general-purpose or special-purpose processor 105 that may be stored on a computer readable storage medium (disk, memory etc.) to be executed by such a processor 105.

The processor 105 is configured to read from and write to the memory 107. The processor 105 may also comprise an output interface via which data and/or commands are output by the processor 105 and an input interface via which data and/or commands are input to the processor 105.

The memory 107 is configured to store a computer program 109 comprising computer program instructions (computer program code 111) that controls the operation of the apparatus 101 when loaded into the processor 105. The computer program instructions, of the computer program 109, provide the logic and routines that enables the apparatus 101 to perform the methods illustrated in FIG. 3. The processor 105 by reading the memory 107 is able to load and execute the computer program 109.

The apparatus 101 therefore comprises: at least one processor 105; and at least one memory 107 including computer program code 111, the at least one memory 107 and the computer program code 111 configured to, with the at least one processor 105, cause the apparatus 101 at least to perform: receiving 301 at least one first measurement signal from a first movement sensor 203; receiving 303 at least one second measurement signal from a second movement sensor 205 wherein the first movement sensor 203 and the second movement sensor 205 are provided on the same structure 209; identifying 305 one or more correlations between the measurement signals; and using 307 the identified one or more correlations to adjust at least one output signal provided by at least one detector 207.

As illustrated in FIG. 1 the computer program 109 may arrive at the apparatus 101 via any suitable delivery mechanism 113. The delivery mechanism 113 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 109. The delivery mechanism may be a signal configured to reliably transfer the computer program 109. The apparatus 101 may propagate or transmit the computer program 109 as a computer data signal. In some examples the computer program 109 may be transmitted to the apparatus 101 using a wireless protocol such as Bluetooth, Bluetooth Low Energy, Bluetooth Smart, 6LoWPan (IP$_v$6 over low power personal area networks) ZigBee, ANT+, near field communication (NFC), Radio frequency identification, wireless local area network (wireless LAN) or any other suitable protocol.

The computer program 109 comprises computer program instructions for causing an apparatus 101 to perform at least the following: receiving 301 at least one first measurement signal from a first movement sensor 203; receiving 303 at least one second measurement signal from a second movement sensor 205 wherein the first movement sensor 203 and the second movement sensor 205 are provided on the same structure 209; identifying 305 one or more correlations between the measurement signals; and using 307 the identified one or more correlations to adjust at least one output signal provided by at least one detector 207.

The computer program instructions may be comprised in a computer program 109, a non-transitory computer readable medium, a computer program product, a machine readable medium. In some but not necessarily all examples, the computer program instructions may be distributed over more than one computer program 109.

Although the memory 107 is illustrated as a single component/circuitry it may be implemented as one or more separate components/circuitry some or all of which may be integrated/removable and/or may provide permanent/semi-permanent/dynamic/cached storage.

Although the processor 105 is illustrated as a single component/circuitry it may be implemented as one or more separate components/circuitry some or all of which may be integrated/removable. The processor 105 may be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Figure 2:
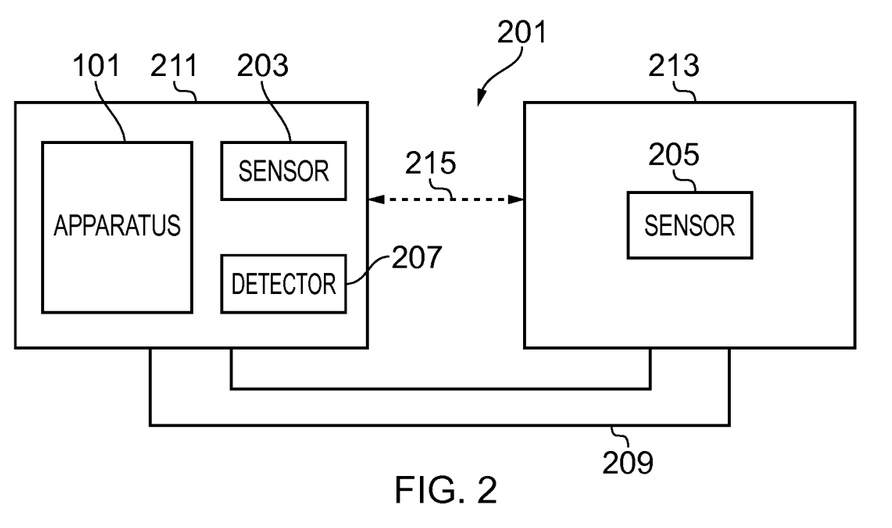
FIG. 2 illustrates an example system.

FIG. 2 illustrates an example system 201 that could be used to implement examples of the disclosure. The system 201 comprises a first movement sensor 203, a second movement sensor 205, at least one detector 207, a structure 209 and an apparatus 101. In the example system of FIG. 2 the first movement sensor 203 and the detector 207 are provided within a first device 211 while the second movement sensor 205 is provided within a second device 213.

The second movement sensor 205 is located apart from the first device 211, for example in a second device 213, even when provided on the same structure 209. The second movement sensor 205 can move relative to the first movement sensor 203 and the first device 211 even when provided on the same structure 209.

The first device 211 and the second device 213 could be independent devices 211, 213. The devices 211, 213 may be independent of each other in that they can be removed from the structure 209 and moved independently of each other without the need for any specialist tools or inputs. For example the first device 211 and the second device 213 could be temporarily attached to the structure 209 for the period of time that the detector 207 is detecting information and then could be removed from the structure 209.

The devices 211, 213 could be independent of each other in that they can be configured to perform functions independently of each other. For instance, the first device 211 could be a portable electronic device such as a telephone or imaging device which can be operated to enable functions such as image capture and/or communications without any input from the second device 213. Similarly the second device 213 could be a wearable electronic device such as a watch, headset, chest strap or other wearable device which could be configured to perform functions such as monitoring a user's biometric parameters without input from the first device 211. Other types of device 211, 213 could be used in other examples of the disclosure.

In some examples of the disclosure a communication link 215 may be provided between the first device 211 and the second device 213. The communication link 215 could be a direct communication link 215 between the first device 211 and the second device 213. For instance, the communication link 215 could be short range communication link 215 such as Bluetooth, Bluetooth Low Energy, Bluetooth Smart, 6LoWPan (IP$_v$6 over low power personal area networks) ZigBee, ANT+, near field communication (NFC), or any other suitable communication link 215. In other examples the communication link 215 could be an indirect communication link 215 in which the first device 211 and the second device 213 could communicate via one or more intervening devices and/or networks.

The communication link 215 could enable the first device 211 and the second device 213 to be synchronised. This could enable the time at which a measurement is made by the first movement sensor 203 to be synchronised with the time a measurement is made by the second movement sensor 205.

In some examples the communication link could enable information obtained by the movement sensors 203, 205 to be transmitted between the devices 211, 213. For instance, information obtained by the second movement sensor 205 in the second device 205 could be transmitted to the first device 211. This could enable a first measurement signal from the first movement sensor 203 and a second measurement signal from the second movement sensor 205 to be processed by an apparatus 101 in the first device 211.

The communication link 215 may be enabled by at least one transceiver at the device 211 and at least one transceiver at the device 213. The transceivers may comprise any suitable means for receiving and/or transmitting information. The information that is transmitted may be transmitted with or without local storage of the data in memory at the devices 211, 213 and with or without local processing of the data by circuitry or processors at the devices 211, 213. The transceivers may comprise, respectively, one or more transmitters and/or receivers. The transceivers may enable a wireless connection between the devices 211, 213. The wireless connection could be via short-range radio communications such as, for example, Wi-Fi, Bluetooth, Bluetooth Low Energy, Bluetooth Smart, 6LoWPan (IPv6 over low power personal area networks) ZigBee, ANT+, near field communication (NFC), or any other suitable type of connection.

The movement sensors 203, 205 may comprise any means which may be configured to sense movement and/or a position and provide a measurement signal indicative of the sensed movement and/or position. The movement sensors 203, 205 may be configured to sense the movement and/or the position of the structure 209 of the system 201. In some examples the movement sensors 203, 205 could be configured to sense the movement and/or the position of the devices 211, 213 within the system 201. The movement sensors 203, 205 could be configured to sense the geographical location, the angular orientation, the elevation or any other suitable position or change in position of the respective components of the system 201.

The movement sensors 203, 205 could comprise any suitable type of movement sensors which can produce an output measurement signal indicative of a position or change in position. For example the movement sensors 203, 205 could comprise any one or more of accelerometers, gyroscopes, magnetometers or any other suitable means.

In some examples the first movement sensor 203 and the second movement sensor 205 could comprise the same type of sensor. In other examples the first movement sensor 203 and the second movement sensor 205 could comprise different types of sensor.

In the system 201 shown in FIG. 2 the first movement sensor 203 is independent of the second movement sensor 205 in that a measurement made by one of the movement sensors 203, 205 does not affect a measurement being made by the other movement sensor 203, 205. That is the first movement sensor 203 can obtain a measurement of position and/or movement without affecting a measurement made by the second movement sensor 205 and similarly the second movement sensor 205 can obtain a measurement of position and/or movement without affecting a measurement made by the first movement sensor 203. The first movement sensor 203 may be independent of the second movement sensor 205 in that the first movement sensor 203 is provided in a first device 211 which is independent of the second device 213 which comprises the second movement sensor 205.

In the example system of FIG. 2 the detector 207 may also be provided within the first device 211. The detector 207 may comprise any means for detecting an input and providing a corresponding output signal. The detector 207 could be configured to detect information about the environment in which the detector 207 is located. The information could comprise images, audio or any other suitable information.

In some examples the detector 207 could comprise an imaging module. The imaging module may comprise any means which may be configured to obtain images. The imaging module may comprise an image sensor which may be configured to convert light incident on the image sensor into an electrical signal to enable an image to be produced. The image sensor may comprise, for example, digital image sensors such as charge-coupled-devices (CCD) or complementary metal-oxide-semiconductors (CMOS). The images which are obtained may provide a representation of a scene and/or objects which are positioned in front of the imaging module. In some examples the imaging module could also comprise one or more optical devices such as lenses which could be configured to focus the light incident on the image sensor.

In some examples the imaging module may comprise a plurality of image sensors which may be configured to enable three dimensional images to be obtained. In such cases it may be useful to know the precise location of the image sensors when they are capturing the images.

In some examples the one or more detectors 207 could comprise an audio capture module. The audio capture module could comprise one or more microphones which may be configured to capture an audible signal and transduce the audible signal into an electrical output signal. The audio capture module could comprise an array of microphones which could be configured to capture spatial audio signals. In such cases it may be useful to know the precise location of the microphones when they are capturing the audio signals.

It may be useful to know the precise location of the detector 207 when it is detecting an input, from which is derived a corresponding output signal.

The first and second measurement signals which are output by the first and second movement sensors 203, 205, for example as a result of background processes, while the detector 207 detects said input, for example as a foreground process, can be used to determine the precise location of the detector 207.

During a period of time in which the detector 207 detects the at least one input to which the at least one provided output signal corresponds, the first movement sensor 203 is controlled to provide the first measurement signal and the second movement sensor 205 is caused to provide the second measurement signal. For example, the device 211 could communicate a request for the second measurement signal to the second movement sensor 205 (or device 213 comprising the second movement sensor 205) via the communication link 215. This may trigger the provision of the second measurement signal which can be transmitted to the device 211 via the communication link 215. The detection of the at least one input by the detector 207 may be a foreground process and the provision of the first measurement signal and the receipt of the second measurement signal may be background processes.

A foreground process may be one which is designated to run by the user and/or which a user is currently utilising. A background process may be one which runs without user intervention, in the background, and is transparent or substantially transparent to the user in that a user interface (for example that of the device 211, comprising the detector 207) is substantially unchanged as a result of the process running.

In the example system 201 of FIG. 2 the first movement sensor 203 is coupled to the detector 207. The first movement sensor 203 may be coupled to the detector 207 so as to restrict movement of the first movement sensor 203 relative to the detector 207. The first movement sensor 203 may be coupled to the detector 207 so that any movement of the first movement sensor 203 is matched by a movement of the detector 207. In the example system 201 of FIG. 2 the first movement sensor 203 is coupled to the detector by both the first movement sensor 203 and the detector 207 being provided within the same device 211. For instance, the first movement sensor 203 and the detector 207 could both be provided within the same communication device or imaging device. As both the first movement sensor 203 and the detector 207 are provided within the same device, if the position of the detector 207 changes then the position of the first movement sensor 203 also changes.

Both the first movement sensor 203 and the second movement sensor 205 are provided on the same structure 209. The structure 209 comprises a physical body which can support both the first movement sensor 203 and the second movement sensor 205. The structure 209 may be configured to bear, or at least partially bear, the weight of both the first movement sensor 203 and the second movement sensor 205. The first movement sensor 203 and the second movement sensor 205 may be provided on the same structure 209 by attaching the first device 211 and the second device 213 to the structure 209.

The structure 209 may be configured to kinetically link both the first movement sensor 203 and the second movement sensor 205. The kinetic linking may ensure that there is a correlation between movements detected by the different movement sensors 203, 205. For example, if a first movement is made by the first movement sensor 203 then the kinetic linking will define what movement should be made by the second movement sensor 205. The movements that are detected by the different movement sensors 203, 205 could be different.

In some examples the structure 209 kinetically links the first movement sensor 203 and the second movement sensor 205 such that if one of the movement sensors 203, 205 moves then the second movement sensor will also move. For instance the structure 209 could be configured so that if movement of the structure 209 causes movement of one of the movement sensors 203, 205 then it will also cause a related movement of the other movement sensor 203, 205.

The kinetic linking of the structure 209 may be determined so that the expected relationship between the movement of the movement sensors 203, 205 can be determined. For example it may be determined how the structure 209 causes the movements of the different movement sensors 203, 205 to be correlated.

In some examples the structure 209 could be the body of a user of the devices 211, 213. For instance, a user could hold a first device 211 in their hand and attach the second device 213 to a different part of their body. In such examples the second device 213 could be attached by a strap, or other suitable means, to the user's arm or torso or any other suitable part of the body. In such examples the movement of the hand that is holding the first device 211 is linked to the movement of the other parts of the user's body. Machine learning, or any other suitable process could be used to determine how the structure 209 causes the movements of the two devices 211, 213 to be correlated.

In some examples the structure 209 could be a combination of a plurality of different components that are connected together. For instance, the first device 211 could be mounted on a first component and the second device 213 could be mounted on a second component. The first and second components could be coupled together temporarily so that the components can be used separately from each other. In some examples the first and second components could be coupled together by one or more intervening components. As an example the structure 209 could comprise a user holding a selfie stick. In such examples the first device 211 could be mounted on the selfie stick while the second device 213 is attached to the user's arm or other part of their body. The selfie stick and the user's body form a single structure 209 because the user is holding the selfie stick.

In some examples the structure 209 could be a physical structure such as drone. In such examples the drone could comprise two or more measurement sensors 203, 205 provided at any suitable locations within the drone.

In some examples the structure could be a physical structure such as a building. For instance a first device 211 could be located in a first part of a building and a second device 213 could be located in a second part of the building. In such examples the measurement signals from the movement sensors 203, 205 could be used to adjust for movement of a building caused by earthquakes, high wind or any other suitable factors.

In the example system 201 of FIG. 2 the first device 211 comprises an apparatus 101. The apparatus 101 could be as described in relation to FIG. 1. The apparatus 101 may be configured to obtain the measurement signals from the movement sensors 203, 205 and use these to adjust the output of the detector 207.

In other examples the apparatus 101 could be provided in a different location. For instance, in some examples the apparatus 101 could be provided in the second device 213 which does not contain the detector 207. In such examples the measurement signal from the first movement sensor 203 and the output from the detector 207 could be transmitted to the second device 213. In other examples the apparatus 101 could be provided in a different device. For example, the apparatus 101 could be in a remote server or distributed across a network and need not be provided on the structure 209.

It is to be appreciated that the system 201 shown in FIG. 2 is an example system and that variations could be made to this system 201. For instance, in the example of FIG. 2 the system 201 comprises two movement sensors 203, 205. In other examples more than two movement sensors 203, 205 could be provided. Also in some examples more than one detector 207 could be provided, for instance a detector 207 could be provided in each of the devices 211, 213 within the system 201. In other examples the detector 207 might not be provided within either of the devices 211, 213. For instance, the one or more detectors 207 could be provided in separate devices which could be coupled to the movement sensors 203, 205 via the structure 209 and/or any other suitable means. In other examples the one or more detectors 207 need not be coupled to the movement sensors 203, 205. For example both of the movement sensors 203, 205 could be provided in dedicated sensing devices which could be configured to communicate with the one or more detectors 207 to enable the output signal to be adjusted.

Figure 3:
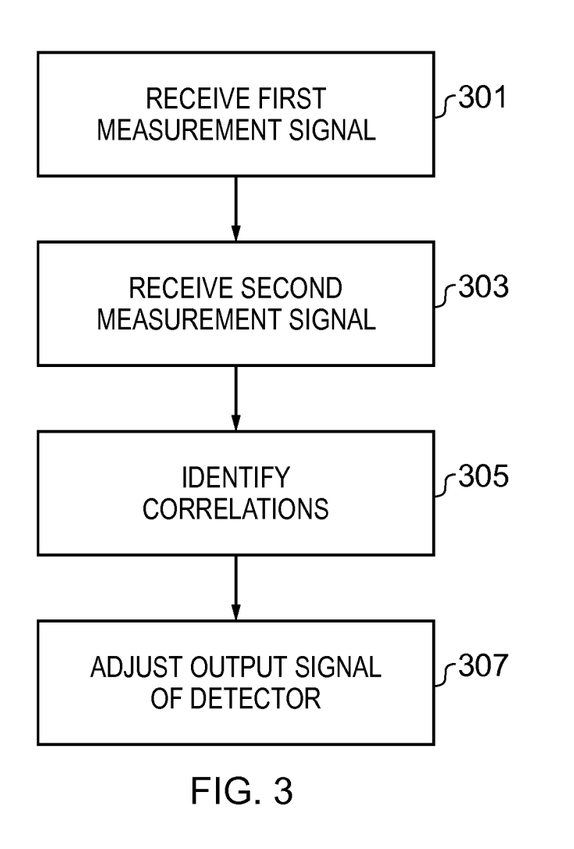
FIG. 3 illustrates an example method.

FIG. 3 illustrates an example method that could be implemented using the example apparatus 101 and systems 201 as described above. The blocks of the example method shown in FIG. 3 could be implemented by an apparatus 101 or by any other suitable device.

The method comprises, at block 301, receiving a first measurement signal from a first movement sensor 203 wherein the first movement sensor 203 is coupled to at least one detector 207. The first measurement signal may comprise information indicative of a change in position, a change in orientation, a speed of the movement or any other suitable information. The change in position and/or orientation could comprise changes in multiple axes. For example the movement sensor could measure the position along three perpendicular axes and could measure the orientation relative to these axes.

The first measurement signal may provide an indication of the position and/or change in position of the first movement sensor 203. As the first movement sensor 203 is coupled to the at least one detector 207 this measurement signal also provides an indication of the position and/or change in position of the detector 207.

The method also comprises, at block 303, receiving a second measurement signal from a second movement sensor 205 wherein the first movement sensor 203 and the second movement sensor 205 are provided on the same structure 209. The second measurement signal may comprise information indicative of a change in position, a change in orientation, a speed of the movement or any other suitable information. For example the movement sensor could measure the position along three perpendicular axis and could measure the orientation relative to these axis.

The second measurement signal may provide an indication of the position and/or change in position of the second movement sensor 205. As the second movement sensor 205 is coupled to the at first movement sensor 203 via the structure 209 there will be a relationship between the first measurement signal and the second measurement signal. The relationship may comprise features in each of the measurement signals that are caused by a movement of the structure 209. The relationship may comprise a correlation between the first measurement signal and the second measurement signal that is caused by a movement of the structure 209.

The second measurement signal could be transmitted via a communication link 215 so that it is received by the apparatus 101. This enables the apparatus 101 to process both the first measurement signal and the second measurement signal.

The apparatus 101 may be configured to process both the first measurement signal and the second measurement signal so that the method also comprises, at block 305, identifying one or more correlations between the measurement signals. The block of identifying one or more correlations between the measurement signals may enable any relationship between the first measurement signal and the second measurement signal to be determined. This can enable noise patterns within the measurement signals to be determined.

The block 305 of identifying one or more correlations between the measurement signals may comprise identifying movements common to both of the measurement signals. The movements common to both of the measurement signals could be identified from features within the measurement signals that are caused by the same motion of the structure 209. For instance, where the structure 209 comprises a user's body and the first movement sensor 203 is in a device 211 held in the user's hand and the second movement sensor 205 is in a device 213 attached to the user's arm the movement sensors 203, 205 could sense the user moving their arm, for example they could sense the user raising their arm or making any other suitable movement. In this example, the device 213 is attached to the same arm as the hand that is holding the device 211 such that if the user raises their arm then both the first movement sensor 203 and the second movement sensor 205 will be elevated at the same time although they may be elevated by different amounts due to being coupled to different parts of the user's arm. The apparatus 101 may be configured to detect features within the measurement signals that indicate the correlated movements and use these detected features to identify noise within the measurement signals.

In some examples the block 305 of identifying one or more correlations between the measurement signals may comprise using information about the structure 209 which supports both the first movement sensor 203 and the second movement sensor 205 to identify common features in both of the measurement signals. For instance a model of the structure 209 can be used to predict how the movements detected by the first movement sensor 203 should be related to the movements detected by the second movement sensor 205. The difference in the measured signals and the predicted signals can be used to identify the noise.

The model of the structure 209 could be a theoretical model which could be obtained using a modelling process for the structure 209. In other examples real measurements of the structure 209 and how the structure 209 can move can be used. The real measurements could be used for example where the structure 209 is a manufactured entity such as a drone or building which has been manufactured to have specific dimensions and properties.

In some examples the block 305 of identifying one or more correlations between the measurement signals comprises using machine learning. The machine learning process may be configured to obtain data during a learning phase which enables the relationship between the first measurement signal and the second measurement signal to be learned.

The machine learning can include statistical learning. Machine learning is a field of computer science that gives computers the ability to learn without being explicitly programmed. The computer learns from experience E with respect to some class of tasks T and performance measure P if its performance at tasks in T, as measured by P, improves with experience E. The computer can often learn from prior training data to make predictions on future data. Machine learning includes wholly or partially supervised learning and wholly or partially unsupervised learning. It may enable discrete outputs (for example classification, clustering) and continuous outputs (for example regression). Machine learning may for example be implemented using different approaches such as cost function minimization, artificial neural networks, support vector machines and Bayesian networks for example. Cost function minimization may, for example, be used in linear and polynomial regression and K-means clustering. Artificial neural networks, for example with one or more hidden layers, model complex relationship between input vectors and output vectors. Support vector machines may be used for supervised learning. A Bayesian network is a directed acyclic graph that represents the conditional independence of a number of random variables.

In some examples the machine learning may comprise comparing the first measurement signal and the second measurement signal when the structure 209 makes a known movement and identifying corresponding features within the measurement signals.

In some examples the known movement comprises a predefined gesture that is performed by the structure 209. The predefined gesture could be a movement in which the time, direction vectors and amplitude provide sufficient information to computationally link the measurement signals. For example, where the structure 209 comprises the user's body the user could be instructed to perform a predefined gesture at a predetermined time. In such examples instructions could be provided to the user via a user interface of one of the devices 211, 213 in the system requiring the user to make the gesture. The gesture could be moving their arm, or any other part of their body, in a prescribed manner. While the user is making the gesture the apparatus 101 can compare the respective measurement signals received from the movement sensors 203, 205 to determine how the structure 209 links the movement sensors 203, 205.

In some examples the known movement could comprise a repeated movement that is made by the structure 209. For example it could be the user walking or running or performing some other activity which causes a movement to be repeated over a plurality of cycles. The machine learning can obtain data over a plurality of cycles of the movement and use these to identify corresponding features within the measurement signals and determine how the structure 209 links the movement sensors 203, 205.

In some examples the machine learning process could comprise determining a kinetic linking between the first movement sensor 203 and the second movement sensor 205. The kinetic linking is dependent upon the structure 209 that the movement sensors 203, 205 are provided on. The kinetic linking provides a predictive model of how the respective measurement signals should be linked. The kinetic linking determines how the movement sensors 203, 205 move relative to each other. For example, if a known movement is made the kinetic linking can provide an indication of the measurements that should be provided in response to the known movement.

In other examples, identifying one or more correlations between the measurement signals may comprise determining a displacement of the second movement sensor 205 from the first movement sensor 203 over time. The determined displacement may be an estimate of the displacement. The displacement may be determined based on the first measurement signal and the second measurement signal.

Synchronised measurements made by the first movement sensor 203 and the second movement sensor 205 can be compared in order to determine the displacement of the second movement sensor 205 from the first movement sensor 203 at a given time.

The value of the first measurement signal at each given time during a period of measurement can be subtracted from the value of the second measurement signal at each given time. The resultant time series data can be smoothed to reduce fluctuations in the determined displacement resulting from noise on the individual measurement signals. The smoothing can be achieved by using a moving average. The moving average may be a central moving average and/or a weighted moving average.

Alternatively, the first and second measurement signals can be smoothed, for example using a moving average, before being used to determine the displacement of the first and second movement sensors 203, 205.

The second measurement signal can be translated based on the determined displacement of the second movement sensor 205 from the first movement sensor 203 over time. The translated second measurement signal therefore simulates a measurement signal as if from the second movement sensor 205 had it been placed at the location of the first movement sensor 203 and moved in the same manner as the first movement sensor 203 during the period of measurement. Thus, the first measurement signal and the translated second measurement signal are both indicative of the movement and/or position of the first movement sensor 203.

The values of the first measurement signal and the translated second measurement signal can be averaged at corresponding time points to reduce variation from the true value indicating the true movement and/or position of the first measurement sensor 203.

The time series data resulting from said averaging is indicative of the movement and/or position of the first movement sensor 203 and has reduced noise compared to the first measurement signal output by the first movement sensor 203. The resultant time series data has an increased signal-to-noise ratio compared to the first measurement signal.

Thus, a more precise position and/or location of the first movement sensor 203 can be determined from the resultant time series data than from the first measurement signal. If the detector 207 is coupled to the first movement sensor 203 so that the movement and/or position of the first movement sensor 203 is matched by the detector 207, then a more precise position and/or location of the detector 207 can likewise be determined.

The resultant time series data can be used to adjust at least one output signal of the detector 207. For example, information about the position and/or location of the at least one detector 207 determined from the resultant time series data can be used to adjust at least one output signal provided by the at least one detector 207.

The signal-to-noise ratio can be further increased by obtaining measurement signals from more than two kinetically linked movement sensors, whereby each measurement signal is translated based on an estimated displacement of the respective movement sensor from the first movement sensor 203 over time before averaging over these more than two measurement signals.

Besides averaging, other noise removal techniques can be used in conjunction with the first measurement signal and the translated second measurement signal.

It is to be appreciated that while the second measurement signal has, in the foregoing, been described as being translated based on the estimated displacement of the second movement sensor 205 from the first movement sensor 203 over time, alternatively both the first and second measurement signal could be translated based on respective displacements of the first and second movement sensors 203, 205 from a third object or location.

The displacement of the second movement sensor 205 from the first movement sensor 203 over time can alternatively be estimated, for use in translating the second measurement signal, by other methods.

For example, the movement between the first and second sensors 203, 205 can be classified in accordance with a library of predefined gestures. The predefined gestures in the library may be associated with respective functions of respective predefined forms. The value of the coefficients in these functions are to be determined. Once it is determined which predefined gestures the movement corresponds to, the respective function can be selected and the coefficients of this function obtained by fitting this function to the input first and second measurement signals using regression analysis. The fitted function, for which the coefficients are known, thus describes an estimate of the displacement of the second movement sensor 205 from the first movement sensor 203 over time.

The classification of the movement between the first and second sensors 203, 205 in accordance with a library of predefined gestures may be performed by a classification algorithm. The classification algorithm may be a trained machine learning model produced during a calibration or learning phase. In this example the machine learning is in the form of supervised learning. The model is trained using labelled and paired training data from the first and second movement sensors 203, 205 wherein the labels correspond to the predefined gestures. The labelling may be effected by instructing the user to make the predefined gesture and measuring the signals output from the first and second movement sensors 203, 205 while the user responds to this instruction.

The method shown in FIG. 3 also comprises, at block 307, using the identified one or more correlations to adjust at least one output signal provided by the at least one detector 207.

In some examples using the identified one or more correlations to adjust at least one output signal provided by the detector 207 comprises at least partially removing noise from one or both of the measurement signals. The relationship between the two measurement signals can be used to identify noise within the signals and then remove that noise from the measurement signals. This enables more accurate information about the position of the detector 207 to be obtained. This more accurate position information can then be used to adjust the output from the detector 207.

The adjusting of the output signal provided by the detector 207 may comprise correcting output signals from the detector 207. The corrections could be made to take into account movement and/or changes in position which are measured by the movement sensors 203, 205. This could reduce aberration or blurring in images obtained by an imaging module for example.

In some examples the adjusting of the output signal could comprise associating metadata with the output signal. The metadata could comprise information about the location of the detector 207 which may be determined from the measurement signals from the movement sensors 203, 205. As the measurement signals have been corrected to reduce the noise in the signals this may provide more accurate metadata. This could provide for improved outputs from the detectors 207, for example it may enable more realistic and higher quality three dimensional images to be obtained and/or may enable more realistic and higher quality spatial audio to be obtained.

The output signal could initially be associated with metadata comprising information about the location of the detector 207 which is determined from the first measurement signals from the first movement sensors 203. This metadata can later, for example in post-processing, be updated with information about the location of the detector 207 which is determined from the time series data resulting from averaging the first measurement signal with, at least, the translated second measurement signal.

It is to be appreciated that variations of the method could be used in implementations of the disclosure. For example, in the method of FIG. 3 a first measurement signal and a second measurement signal are obtained. In other examples more than two measurement signals can be obtained from more than two different movement sensors. Also in the example method of FIG. 3 only a single detector 207 has the output adjusted. In other examples there may be a plurality of detectors 207 and the outputs of each of the one or more detectors 207, or a subset of the detectors 207, could be adjusted using the reduced noise measurement signals.

Figure 4:
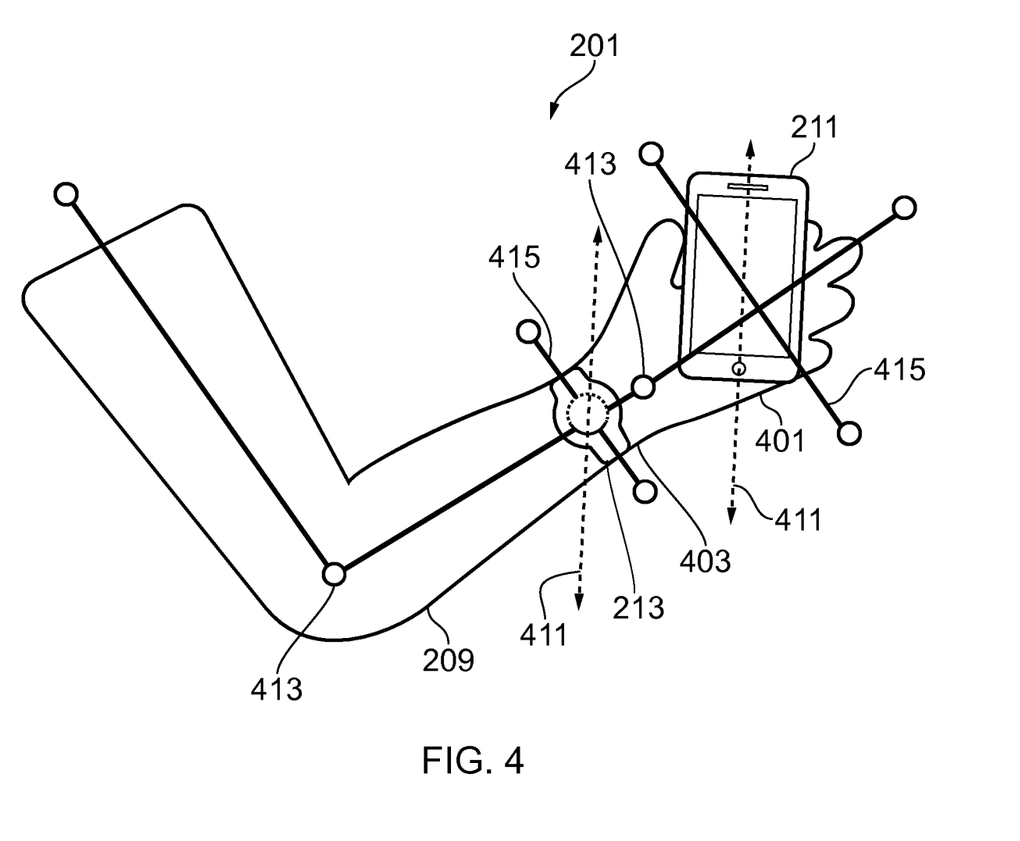
FIG. 4 illustrates another example apparatus.

FIG. 4 illustrates another example system 201 that could be used to implement examples of the disclosure. In this example system 201 the first device 211 is a mobile telephone which is held in the hand 401 of a user and the second device 213 is a watch which is attached to the user's wrist 403. In this example system 210 the watch 213 is attached to the same arm as the hand 401 that is holding the first device 211. In this case the user's arm 209 provides the structure 209 that kinetically links the first device 211 and the second device 213. The respective movement sensors 203, 205, detectors 207 and the apparatus 101 would be provided internally of the devices 211, 213 and so are not shown in FIG. 4.

In the example system 201 of FIG. 4 the user is instructed to make a predefined gesture. In the example of FIG. 4 the gesture is indicated by the dashed arrows 411. The gesture comprises moving the arm upwards and downwards in a direction that is vertical, or substantially vertical. Other gestures could be used in other examples of the disclosure. In some examples the user could be required to make a sequence of predefined gestures in order to enable sufficient measurement signals to be obtained.

When the user makes the predefined gestures the apparatus 101 can use machine learning, or any other suitable process, to determine a kinetic linking between the first device 211 and the second device 213. The kinetic linking could provide an indication of the distance between the devices 211, 213 and any pivot points 413 in the structure. The kinetic linking could also provide an indication of the axis 415 along which the devices 211, 213 can be moved.

Once the kinetic linking has been determined this can be used to compare the measurement signals from the first movement sensor 203 and the second movement sensor 205. The kinetic linking can give an indication of the noise in the measurement signals as it can give an indication of the signal that should be expected for a given movement. This noise can then be removed from the measurement signals and the corrected measurement signals can be used to adjust the outputs from detectors 207 within the first device 211.

Examples of the disclosure therefore provide apparatus 101, systems 201 and methods for reducing noise in measurement signals which can then be used to provide higher quality output signals from detectors 207. For example it can enable movement of the detector 207 to be accounted for in the output signal.

As machine learning can be used to reduce the noise in the measurement signals this can provide for an efficient way of improving the output signal.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to 'comprising only one . . . ' or by using 'consisting'.

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature) or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
   at least one processor; and
   at least one memory including computer program code,
   the at least one memory and the computer program code configured to, with the at least one processor, cause the apparatus at least to perform:
   receive at least a first measurement signal from a first movement sensor;
   receive at least a second measurement signal from a second movement sensor wherein the first movement sensor and the second movement sensor are provided on or held by the same structure and the first movement sensor is movable independent of the second movement sensor;
   identify one or more correlations between the first measurement signal and the second measurement signal, dependent upon at least one of a movement or a position of the same structure on which or by which the first movement sensor and the second movement sensor are provided or held; and
   use the identified one or more correlations to adjust at least one output signal, comprising at least one of image data or audio data, provided by at least one detector, by at least partially removing noise from at least one of the first measurement signal or the second measurement signal.

2. An apparatus as claimed in claim 1 wherein the first movement sensor is coupled to the at least one detector.

3. An apparatus as claimed in claim 2 wherein the first movement sensor is coupled to the at least one detector by both the first movement sensor and the at least one detector being provided within the same device.

4. An apparatus as claimed in claim 3 wherein the second movement sensor is provided within a different device and the different device is configured to transmit information from the second movement sensor to the apparatus.

5. An apparatus as claimed in claim 1 wherein the one or more correlations between the first measurement signal and the second measurement signal indicate movements common to both of the first measurement signal and the second measurement signal.

6. An apparatus as claimed in claim 1 wherein identifying one or more correlations between the first measurement signal and the second measurement signal comprises using information about the structure which supports both the first movement sensor and the second movement sensor to identify common features in both of the first measurement signal and the second measurement signal.

7. An apparatus as claimed in claim 1 wherein identifying one or more correlations between the first measurement signal and the second measurement signal comprises using machine learning.

8. An apparatus as claimed in claim 7 wherein the machine learning comprises comparing the first measurement signal and the second measurement signal when the structure makes a known movement and identifying features within the first measurement signal and the second measurement signal.

9. An apparatus as claimed in claim 8 wherein the known movement comprises a predefined gesture that is performed by the structure.

10. An apparatus as claimed in claim 7 wherein the machine learning comprises determining a kinetic linking between the first movement sensor and the second movement sensor wherein the kinetic linking is dependent upon the structure that the movement sensors are provided on.

11. An apparatus as claimed in claim 1 wherein the movement sensors comprise one or more accelerometers.

12. An apparatus as claimed in claim 1 wherein during a period of time in which the detector detects at least one input to which the at least one provided output signal corresponds, the at least one memory and the computer program code are configured to, with the at least one processor, cause the apparatus at least to: cause the first movement sensor to provide the first measurement signal; and cause the second movement sensor to provide the second measurement signal.

13. An apparatus as claimed in claim 12 wherein the detection of the at least one input by the detector is a foreground process, and wherein the receipt of the first measurement signal and the receipt of the second measurement signal are background processes.

14. An apparatus as claimed in claim 1 wherein the at least one detector comprises at least one of, an imaging module, or audio capture module.

15. A non-transitory computer readable medium comprising program instructions stored thereon for performing at least the following:
   receiving at least one first measurement signal from a first movement sensor;
   receiving at least one second measurement signal from a second movement sensor wherein the first movement sensor and the second movement sensor are provided on the same structure and the first movement sensor is movable independent of the second movement sensor;
   identifying one or more correlations between the first measurement signal and the second measurement signal, dependent upon at least one of a movement or a position of the same structure on which or by which the first movement sensor and the second movement sensor are provided or held; and
   using the identified one or more correlations to adjust at least one output signal, comprising at least one of image data or audio data, provided by at least one detector, by at least partially removing noise from at least one of the first measurement signal or the second measurement signal.

16. A device comprising:
a first movement sensor configured to provide a first measurement signal indicative of movement or position of the first movement sensor;
at least one detector configured to detect an input and provide at least one corresponding output signal;
at least one processor; and
at least one memory including computer program code,
the at least one memory and the computer program code configured to, with the at least one processor, cause the device at least to perform:
receiving a second measurement signal from a second movement sensor located apart from the device, the second measurement signal indicative of movement or position of the second movement sensor;
determining a displacement between the first movement sensor and the second movement sensor based on the first measurement signal and the second measurement signal;
translating the second measurement signal based on the displacement between the first movement sensor and the second movement sensor;
determining information about the position or a location of the at least one detector based on the first measurement signal and the translated second measurement signal, dependent upon at least one of a movement or a position of the same structure on which or by which the first movement sensor and the second movement sensor are provided or held; and
using the information about the position or location of the at least one detector to adjust at least one output signal comprising at least one of image data or audio data, provided by the at least one detector by at least partially removing noise from at least one of the first measurement signal or the second measurement signal.

17. The device of claim 16 wherein during a period of time in which the detector detects at least one input to which the at least one provided output signal corresponds, the at least one memory and the computer program code are configured to, with the at least one processor, cause the device to: control the first movement sensor to provide the first measurement signal; and cause the second movement sensor to provide the second measurement signal.

18. The device of claim 17 wherein the detection of the at least one input by the detector is a foreground process, and wherein the provision of the first measurement signal by the first movement sensor and the receipt of the second measurement signal from the second movement sensor are background processes.

19. The non-transitory computer readable medium of claim 15 wherein during a period of time in which the detector detects at least one input to which the at least one provided output signal corresponds, the instructions are further configured to perform: causing the first movement sensor to provide the first measurement signal; and causing the second movement sensor to provide the second measurement signal.

* * * * *